US007074060B2

(12) United States Patent
Lee

(10) Patent No.: US 7,074,060 B2
(45) Date of Patent: Jul. 11, 2006

(54) POWER PLUG

(76) Inventor: Sung-Doo Lee, Geumpoong Villa 201, 142, Sosabon, 1-Dong, Sosa-ku, Bucheon, 422-231, Kyungki-Do (KR)

( * ) Notice: Subject to any disclaimer, the term of this patent is extended or adjusted under 35 U.S.C. 154(b) by 164 days.

(21) Appl. No.: 10/482,345

(22) PCT Filed: Apr. 26, 2002

(86) PCT No.: PCT/KR02/00787

§ 371 (c)(1),
(2), (4) Date: Dec. 29, 2003

(87) PCT Pub. No.: WO03/003529

PCT Pub. Date: Jan. 9, 2003

(65) Prior Publication Data

US 2004/0184295 A1 Sep. 23, 2004

(30) Foreign Application Priority Data

Jun. 28, 2001 (KR) .......................... 2001-19503 U

(51) Int. Cl.
*H01R 4/66* (2006.01)
*H02M 1/00* (2006.01)

(52) U.S. Cl. ....................... 439/102; 439/140; 363/146

(58) Field of Classification Search ................ 363/144, 363/146; 439/102, 106, 109, 136–144, 171–175, 439/638, 640, 131
See application file for complete search history.

(56) References Cited

U.S. PATENT DOCUMENTS

| | | | | |
|---|---|---|---|---|
| 5,186,652 | A * | 2/1993 | Hai-Yung | 439/500 |
| 5,423,690 | A * | 6/1995 | Selker et al. | 439/172 |
| 6,604,954 | B1 * | 8/2003 | Chu et al. | 439/140 |
| 6,722,900 | B1 * | 4/2004 | Segawa et al. | 439/131 |
| 6,863,560 | B1 * | 3/2005 | Brandstatter et al. | 439/518 |

FOREIGN PATENT DOCUMENTS

| | | |
|---|---|---|
| JP | 6-58585 | 8/1994 |
| KR | 1999-0034732 | 9/1999 |
| KR | 20-0188329 | 4/2000 |
| KR | 2000-0031973 | 6/2000 |
| KR | 2000-0073091 | 12/2000 |

* cited by examiner

*Primary Examiner*—Karl Easthom
(74) *Attorney, Agent, or Firm*—Kusner & Jaffe

(57) ABSTRACT

In a power plug capable of preventing twists of a power supply line and turning on/off power supplied to a load device according to a rotation of a rotational unit by dividing the power plug itself into a fixed unit and the rotational unit, the power plug includes the fixed unit at which prongs and a connection terminal connected to the prongs are installed, a rotational unit rotationally installed to the upper portion of the fixed unit and supplying power to the load device, a power on/off unit placed between the fixed unit and the rotational unit and connecting/disconnecting a power supply to the load device according to the rotation of the rotational unit, and a locking unit installed to the upper portion of the rotational unit and locking the rotation of the rotational unit.

8 Claims, 6 Drawing Sheets

POWER PLUG

TECHNICAL FIELD

The present invention relates to a power plug, and in particular to a power plug which is capable of preventing twists of a power supply line and turning on/off power applied to a load device.

BACKGROUND ART

Generally, a power plug is connected with a load device through a power supply line and is inserted into a receptacle connecting to a power source. The power plug includes plural prongs inserted into the receptacle and a casing for protecting the prongs.

In the conventional power plug, because the plural prongs are fixed to the casing, an insertion direction of the plug is fixed (in insertion of the prongs into the receptacle). When plural plugs are inserted into the same receptacle, because the plural plugs and power supply lines thereof are interfered with each other, it is inconvenient to insert and pull out the plus into/from the receptacle. And, the power supply lines may be twisted with each other according to positions of the receptacle and load devices.

In addition, in order to cut off power applied to a load device, prongs have to be pull out from the receptacle, it is inconvenient to use.

In particular, because it is intricate to separate/connect the power plug from/to the receptacle, a user may turn off only power of the load device without pulling out the power plug from the receptacle, in that case, power is wasted, a life span of the load device is reduced, and fire may occur due to overload.

In order to solve the above-mentioned problems, a rotational plug is disclosed in Korea Practical New Device No. 87-5892. In the rotational plug, an intermediate rotational plate connected to a power supply line is installed at a plug body having prongs, the intermediate rotational plate and the plug body are connected to a power source through an electric conduction plate, a plate spring is interposed between the intermediate rotational plate and an upper rotational plate installed at the upper portion of the plug body in order to ground the electric conduction plate with the plug body.

In the rotational plug, the plug body and the intermediate rotational plate connecting to the power supply line are respectively rotated.

However, in the rotational plug, because the intermediate rotational plate is rotationally combined with the plug body, a position of the power supply line can be varied. However, because the electric conduction plate is always contacted to the plug body, it is impossible to perform power on/off function, in order to turn off power, the user has to pull out the plug from the receptacle, and accordingly it is inconvenient to use.

And, a plug disclosed in Korea Practical New Device Official Report No. 93-22426 includes a fixed member at which an upper and a lower contact terminal are fixed; and a rotational member elastically contacting to a certain side of the fixed member at which a power supply line is fixed. In that plug, although the power supply line is moved at various angles in the rotation of the rotational member, power applied to the upper and lower contact terminals can continually flow through the power supply line.

However, in the plug, the position of the power supply line can be changed by the respective rotation of the rotational member at which the power supply line is fixed, however, there is also no power cut off function, in order to cut off power the user has to pull out the plug from the receptacle, and accordingly it is inconvenient to use.

In order to solve the above-mentioned problem, an electrical plug disclosed in Korea Practical New Device Official Report No. 93-22426 had a power on/off function for turning on/off power applied to a load device.

In more detail, the power plug includes an external power input unit inserted into a receptacle so as to receive an external power source; a power control unit having a power supply/cut off unit made of a conductive material to supply/cut off the external power from the external power input unit to an electric appliance; and a power display unit for displaying the power supply/cut off state.

However, in the plug, when the plug is inserted into the receptacle, it is possible to turn on/off power supplied to the load device by rotating the power control unit. However, the power control unit may be easily rotated by an external force, an adjusted position set by the rotation of the rotation control unit may not be maintained stably.

As mentioned above, when the rotation control unit is rotated by the external force, because it is impossible to maintain the power on/off state, power applied to the load device may be abruptly cut off, and accordingly the load device may be damaged by that.

Besides, a plug disclosed in Japan Practical New Device Official Report No. Pyung6-58585 and a rotational plug disclosed in Korea Practical New Device Official Report No. 99-17451 respectively have a system changable a position of a power supply line by using a rotational plug, however, they also had the above-mentioned problems.

TECHNICAL GIST OF THE PESENT INVENTION

In order to solve the above-described problems, it is an object of the present invention to provide a power plug which is capable of preventing twists of a power supply line and turning on/off power supplied to a load device according to a rotation of a rotational unit by including a fixed unit fixed to a receptacle and the rotational unit connected to a load device and maintaining power on/off position stably by locking a set position of the rotational unit.

In order to achieve the above-mentioned object, a power plug, in accordance with the present invention includes a fixed unit at which prongs inserted into a receptacle are fixed and a connection terminal connected to the prongs is installed at the upper surface; a rotational unit rotationally arranged on the upper surface of the fixed unit and having an input terminal connected to a power supply line at the bottom surface; a hinge shaft fixed to the fixed unit, penetrating the rotational unit and supporting the rotational unit rotationally; an elastic member installed at the outer circumference of the hinge shaft to provide an elastic force for making the connection terminal and the input terminal maintain a contact state; a power on/off means formed between the fixed unit and the rotational unit to transmit or cut off power supply to a load device according to rotation of the rotational unit; and a locking means installed at the upper portion of the rotational unit to lock the rotation of the rotational unit.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the preferred embodiments of the present invention will be described with reference to accompanying drawings.

Figure 1:
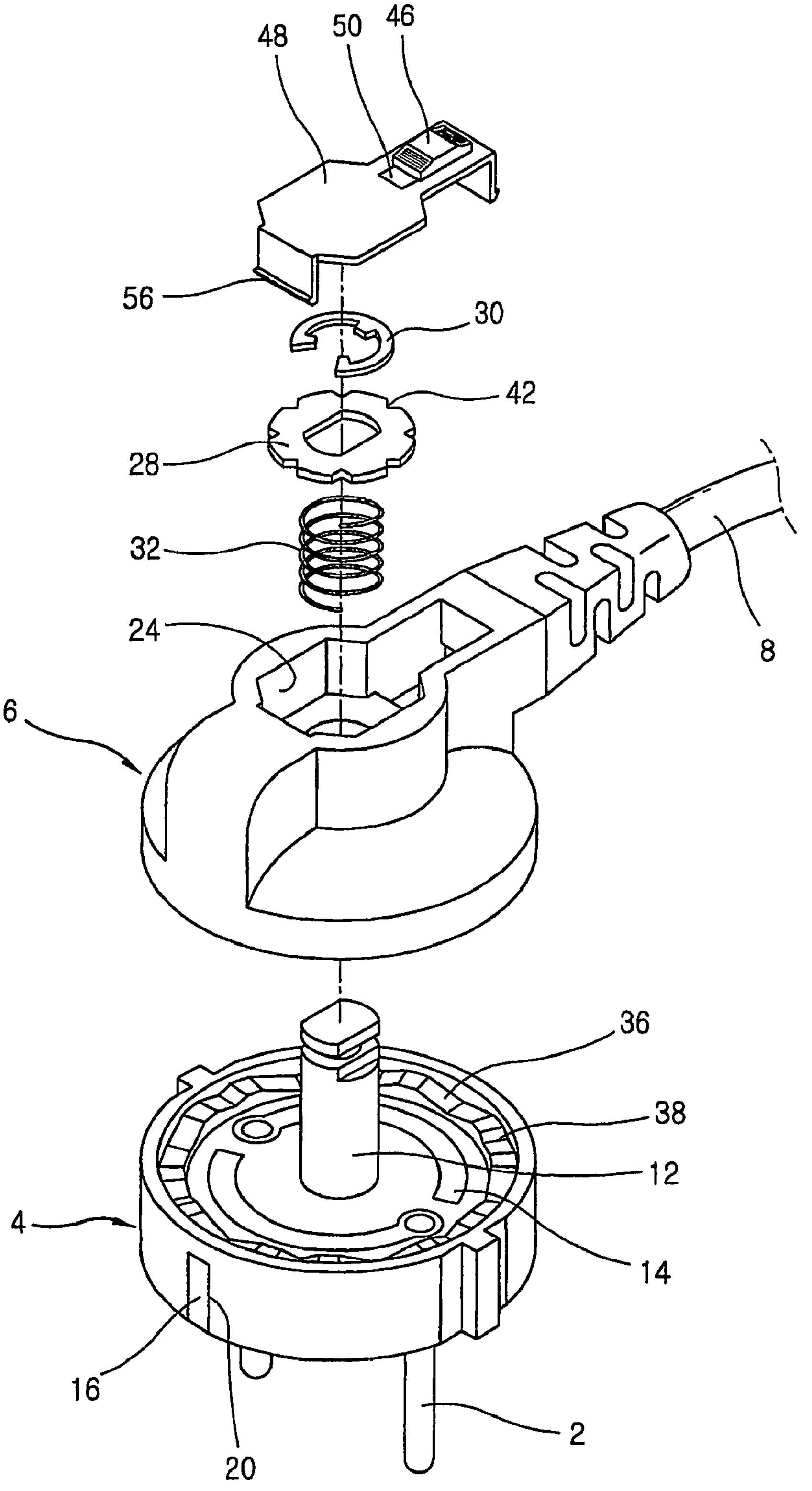
FIG. 1 is an exploded perspective view illustrating a power plug in accordance with an embodiment of the present invention.
Figure 2:
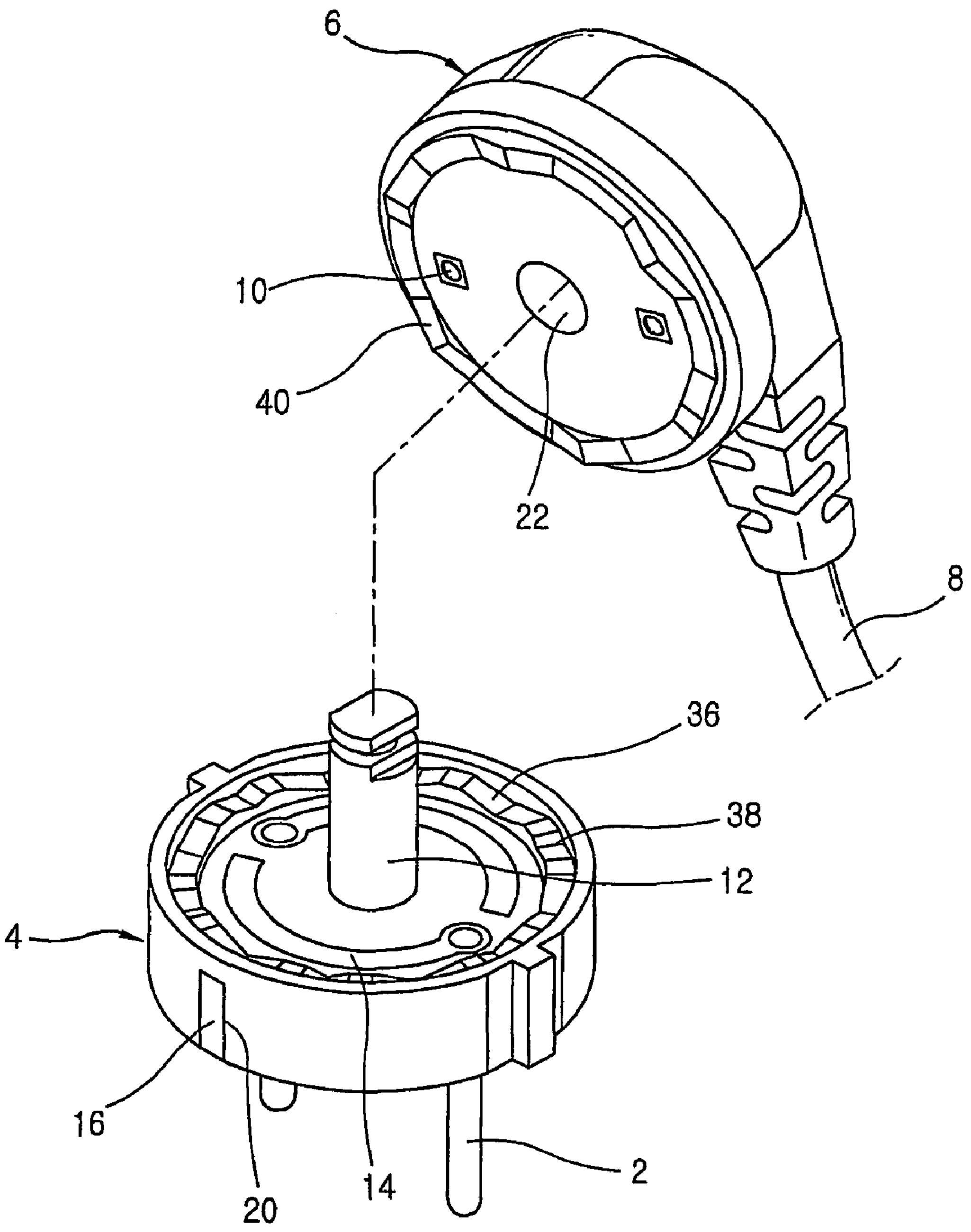
FIG. 2 is an exploded perspective view illustrating a fixed unit and a rotational unit of the power plug in accordance with the embodiment of the present invention.
Figure 3:
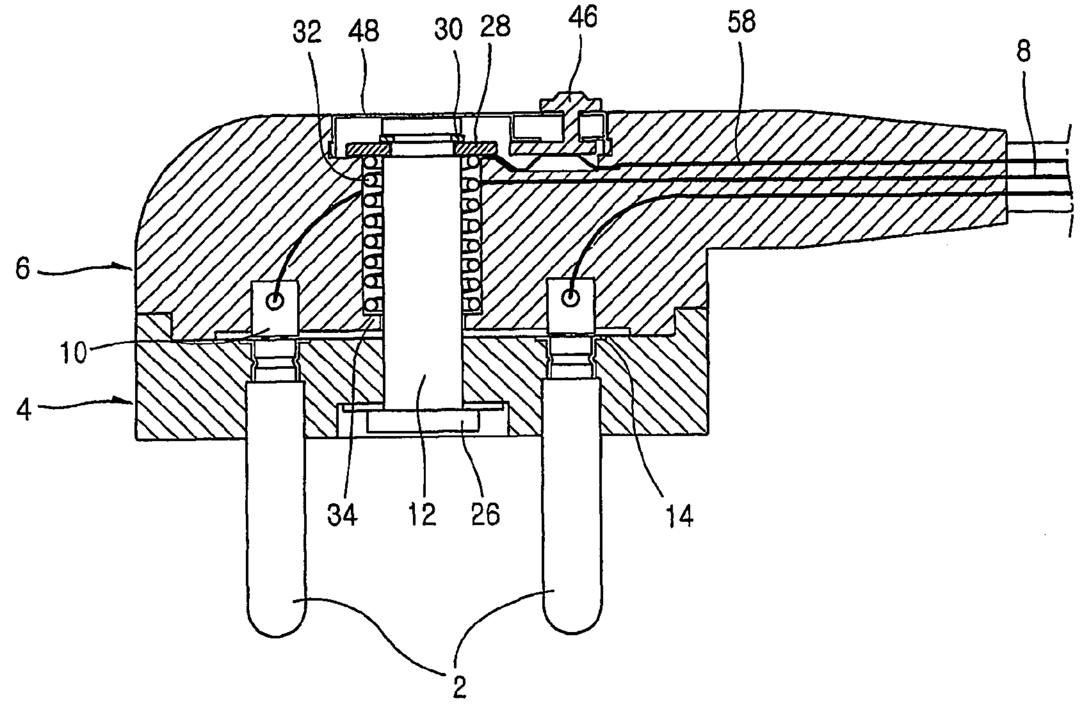
FIG. 3 is a sectional view illustrating the power plug in accordance with the embodiment of the present invention.

FIG. 1 is an exploded perspective view illustrating a power plug in accordance with an embodiment of the present invention, FIG. 2 is an exploded perspective view illustrating a fixed unit and a rotational unit of the power plug in accordance with the embodiment of the present invention, and FIG. 3 is a sectional view illustrating the power plug in accordance with the embodiment of the present invention.

Figure 4:
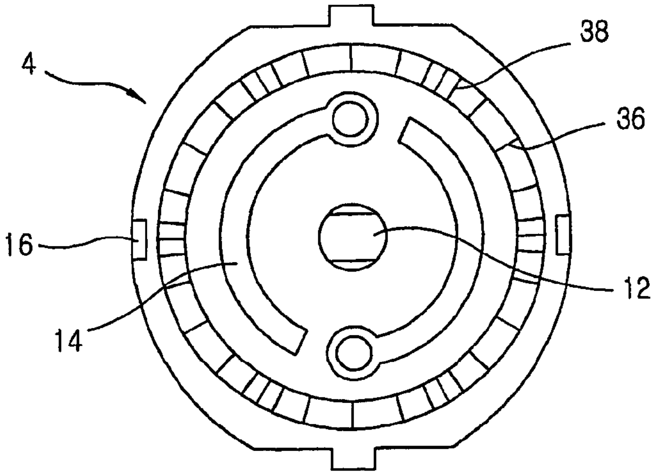
FIG. 4 is a bottom view illustrating the fixed unit of the power plug in accordance with the embodiment of the present invention.
Figure 5:
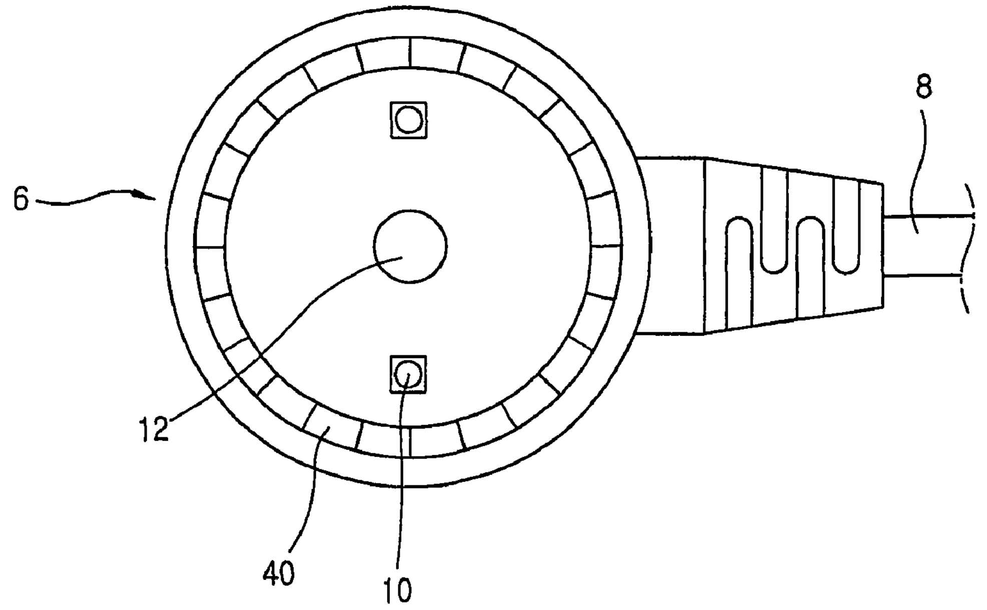
FIG. 5 is a top view illustrating the fixed unit of the power plug in accordance with the embodiment of the present invention.

FIG. 4 is a bottom view illustrating the fixed unit of the power plug in accordance with the embodiment of the present invention, and FIG. 5 is a top view illustrating the fixed unit of the power plug in accordance with the embodiment of the present invention.

The power plug in accordance with the present invention includes a fixed unit 4 at which a pair of prongs 2 inserted into a receptacle (not shown) are fixed; a rotational unit 6 rotationally combined with the fixed unit 4 and connected to a power supply line 8 connecting with a load device; a hinge shaft 12 fixed to the fixed unit 4 and rotationally supporting the rotational unit 6; a power on/off means for turning on/off power supply to the load device according to rotation of the rotational unit 6; and a locking means, etc. installed at the upper portion of the rotational unit 6 to lock the rotation of the rotational unit 6.

In the fixed unit 4 forming a disc shape of a certain thickness, the hinge shaft 12 is inserted into the central portion, the pair of prongs 2 are projected so as to have a certain width, and a pair of connection terminals 14 respectively connected to the pair of prongs 2 are installed at the upper surface of the fixed unit 4.

The connection terminals 14 are a semicircular band type exposed at the upper surface of the fixed unit 4, the end portion of each terminal is respectively connected to the prong 2, when the rotational unit 6 is rotated, they are contacted to the input terminals 10 of the rotational unit 6.

Figure 6:
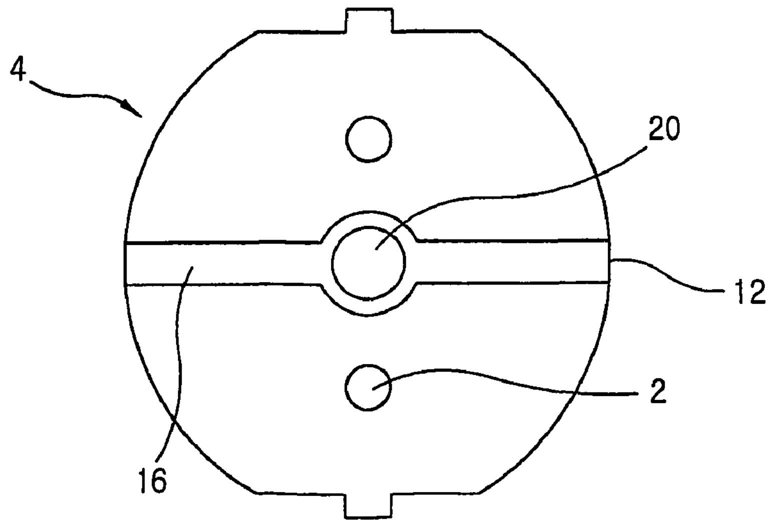
FIG. 6 is a bottom view illustrating the rotational unit of the power plug in accordance with the embodiment of the present invention.

And, as depicted in FIG. 6, a ground plate 16 is installed at the lower portion of the fixed unit 4 in the diameter direction, and the both ends of the ground plate 16 are curved and inserted into an insertion groove 20 respectively formed at the both sides of the fixed unit 4. And, the central portion of the ground plate 16 is pierced, and the hinge shaft 12 is contacted-inserted into the pierced central portion.

In the rotational unit 6, the power supply line 8 connected to the load device is inserted into a certain side, the input terminals 10 are fixed at the bottom surface, a through hole 22 is formed at the central portion so as to receive the hinge shaft 12 vertically; and a space portion 24 extended form the thorough hole 22 and having a locking means is formed at the upper portion.

A lamp such as a light emitting diode, etc. for displaying a present state under the power supply condition can be installed at the rotational unit 6.

The input terminal 10 is connected with the power supply line 8, is contacted with the contact terminal 14 and applies power to the load device.

An outwardly extended flange 26 is formed at the lower end of the hinge shaft 12 so as to be caught on the bottom surface of the fixed unit 4, and a locking ring 28 caught in the space portion 24 of the rotational unit 6 is inserted-combined with the upper end of the hinge shaft 12 in order to prevent the rotational unit 6 from breaking away from the hinge shaft 12.

And, in order to prevent separation of the locking ring 28, a fixed ring 30 is fixed to the upper portion of the hinge shaft 12, and an elastic member 32 for providing a certain elastic force is inserted into the through hole 22 of the rotational unit 6 so as to make the rotational unit 6 contact to the fixed unit 4.

In more detail, in the elastic member as a coil spring inserted into the through hole 22, the end is mounted onto an installation seat 34 projected inwardly from the lower portion of the through hole 22, the other end is mounted onto the bottom surface of the locking ring 28, and accordingly it provides the elastic force to the rotational unit 6 downwardly in order to maintain a certain elastic force between the rotational unit 6 and the fixed unit 4.

Figure 7:
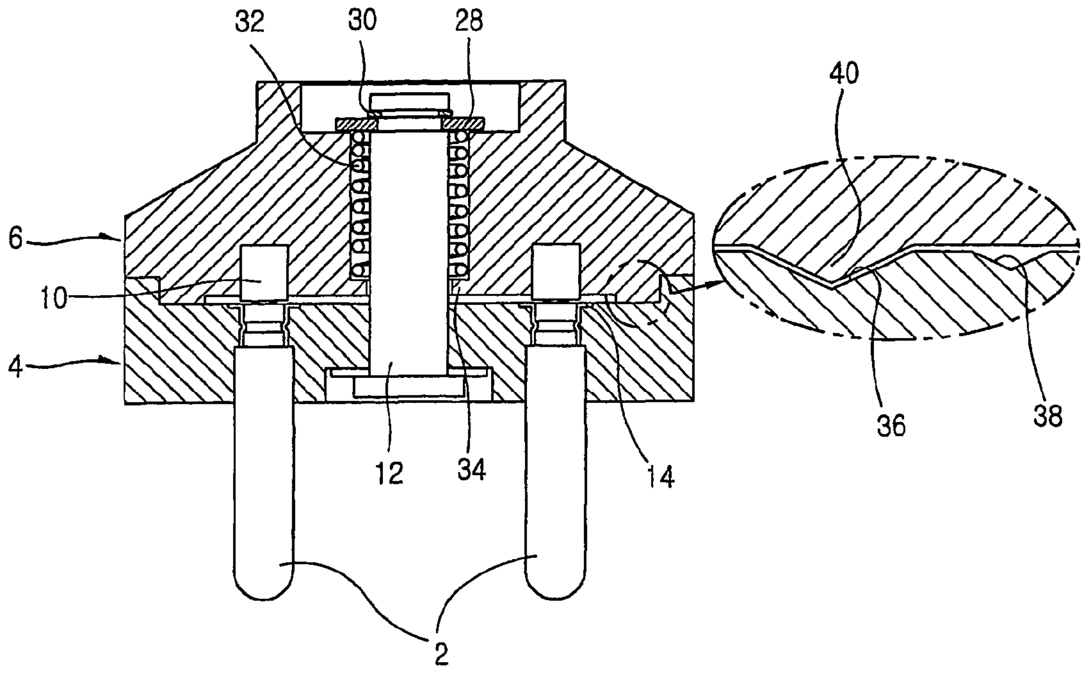
FIG. 7 is a sectional view illustrating a power connection state of the power plug in accordance with the embodiment of the present invention.

As depicted in FIG. 7, the power on/off means is for turning on/off power supplied to the load device by contacting/separating the input terminal 10 of the rotational unit 6 with/from the connection terminal 14 of the fixed unit 4 according to the rotation of the rotational unit 6. The power on/off means includes a first groove 36 respectively formed at the upper surface of the fixed unit 4 in the circumferential direction at regular intervals so as to have a certain depth, a second groove 38 respectively formed between the first grooves 36 and having a depth smaller than that of the first groove 36; and a protrusion 40 projected from the bottom surface of the rotational unit 6 in the circumferential direction so as to have the same shape with the first and second grooves 36, 38.

Herein, it is preferable for the protrusion 40 to have a certain height so as to make the input terminal 10 contact with the connection terminal 14 when the protrusion 40 is inserted into the first groove 36 and make the input terminal

10 separate from the connection terminal 14 when the protrusion 40 is inserted into the second groove 38.

Figure 8:
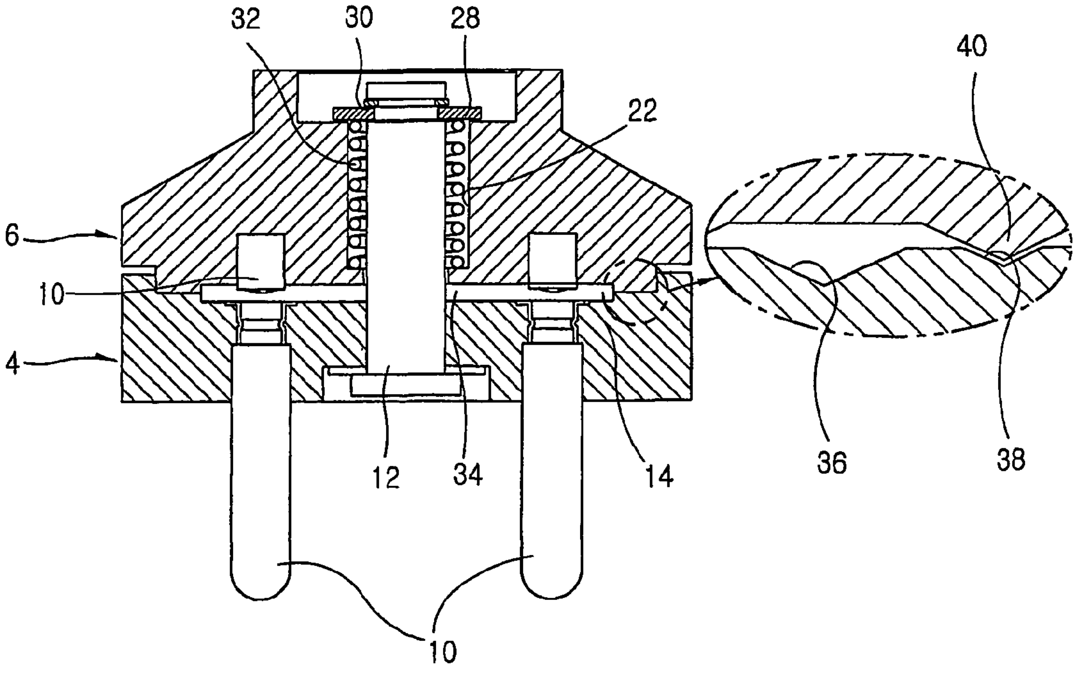
FIG. 8 is a sectional view illustrating a power cut off state of the power plug in accordance with the embodiment of the present invention.

As depicted in FIGS. 7 and 8, in the power on/off means, when the protrusion 40 is inserted into the first groove 36 by the rotation of the rotational unit 6, because the first groove 36 is deep, the connection terminal 14 of the fixed unit 4 contacts with the input terminal 10 of the rotational unit 6, and accordingly power is supplied to the load device, when the protrusion 40 is inserted into the second groove 38 by the more rotation of the rotational unit 6, because the second groove 38 is shallow, the input terminal 10 of the rotational unit 6 is separated from the connection terminal 14 of the fixed unit 4, and power supply to the load device is cut off.

Figure 9:
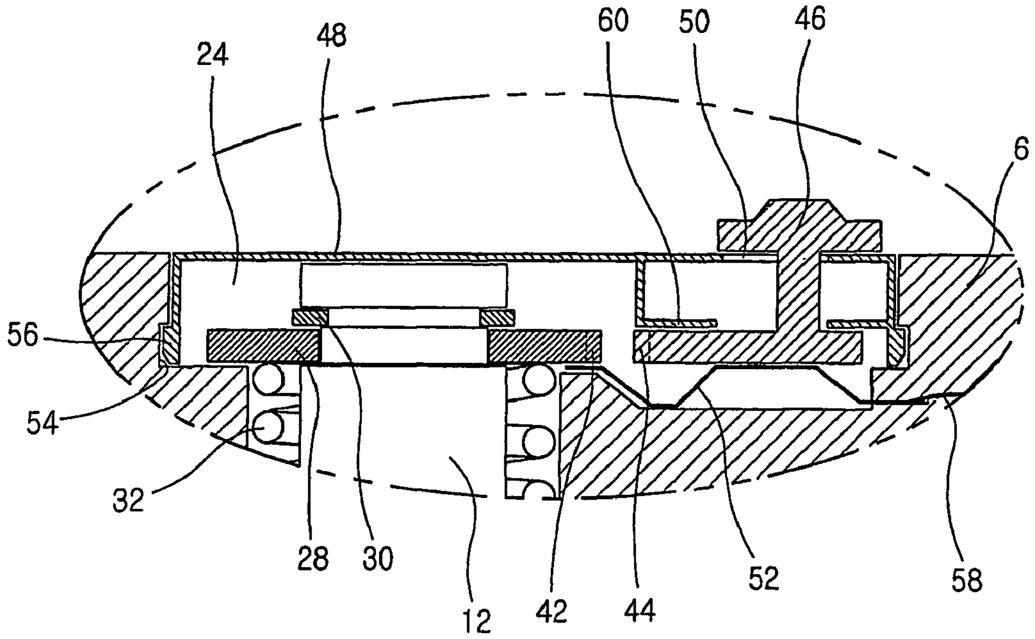
FIG. 9 is a partial sectional view illustrating a structure of a locking means of the power plug in accordance with the embodiment of the present invention.
Figure 10:
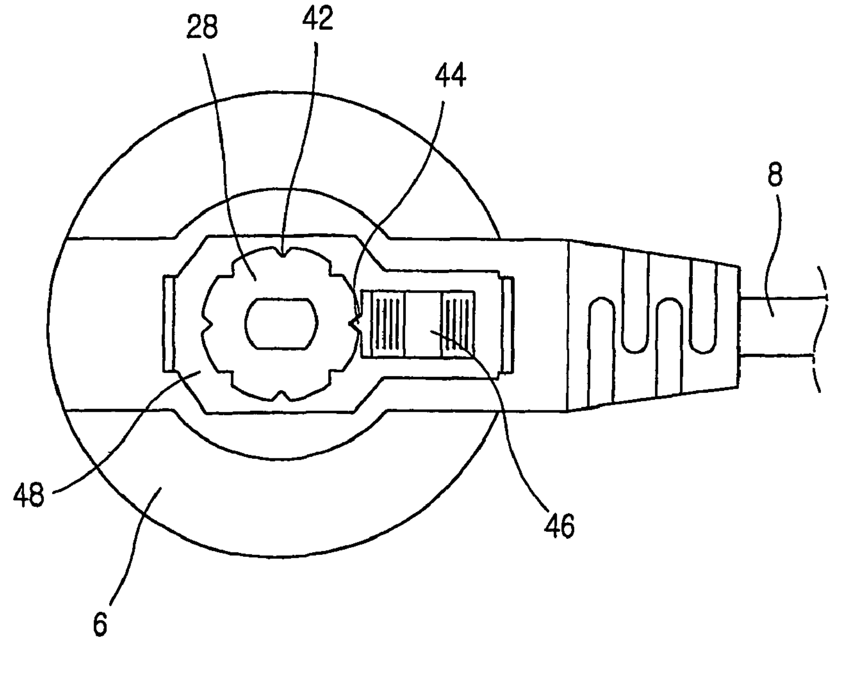
FIG. 10 is a top view illustrating an operation state of the locking means of the power plug in accordance with the embodiment of the present invention.

As depicted in FIGS. 9 and 10, the locking means consists of the locking ring 28 inserted-combined with the upper portion of the hinge shaft 12 and having plural locking grooves 42 formed at the outer circumference at regular intervals and a knob 46 installed at the space portion 24 of the rotational unit 6 so as to move linearly and having plural locking protrusions 44 caught in the locking grooves 42.

And, a cover 48 is installed at the open upper portion of the space portion 24. In the cover 48, in order to fix the cover 48 at the space portion 24, a combining jaw 56 is respectively formed at the both sides of the cover 48 so as to be inserted into a combining groove 54 respectively formed at the both sides of the space portion 24, and a guide hole 50 for guiding the knob 46 moving linearly is formed. And, a guide portion 60 is formed at the lower side portion of the cover 48 to support the linear moving of the knob 46 and guide the linear moving of the locking protrusion 44.

A plate spring 52 is installed at the bottom surface of the knob 46 to support the moved position of the knob 46 by providing a certain elastic force.

In the plate spring 52, one end is grounded with the locking ring 52, and the other end is grounded by connecting to a ground line 58.

Herein, in order to ground the power plug, the ground plate 16 installed at the fixed unit 4 is grounded with the hinge shaft 12, the hinge shaft 12 is grounded with the locking ring 28 made of a metal material, the locking ring 28 is grounded with the plate spring 52 made of a metal material, and the plate spring 52 is connected to the ground line 58.

In the above-described locking means, when the knob 46 is proceeded, because the locking protrusion 44 is caught in the locking groove 42, the rotational unit 6 is locked, when the knob 46 is retroceded, because the locking protrusion 44 is separated from the locking groove 42, the locking of the rotational unit 6 is released.

The operation of the power plug in accordance with the present invention will be described.

When power is transmitted to the load device, the prongs 2 are inserted into the receptacle, the locking of the rotational unit 6 is released, a position of the power supply line 8 is set by the rotation of the rotational unit 6, afterward, the rotational unit 6 is locked, and power is supplied to the load device.

In more detail, after separating the locking protrusion 44 formed at the knob 46 from the locking groove 42 formed at the locking ring 28 inserted-combined with the hinge shaft 12 by retroceding the knob 46 installed at the upper portion of the rotational unit 6, when the protrusion 40 of the rotational unit 6 is inserted into the first groove 36 of the fixed unit 4, the connection terminal 14 connected to the prongs 2 and the input terminal 10 connected to the power supply line 8 are contacted with each other, power is applied from the power source to the load device, in that state, when the knob 46 is proceeded, the locking protrusion 44 is inserted into the locking groove 42, and accordingly the rotational unit 6 is locked.

Herein, because the elastic member 32 provides the elastic force so as to push the rotational unit 6 downwardly, the contact state of the connection terminal 14 and the input terminal 10 is maintained, and accordingly the power on state is maintained stably.

On the contrary, when power transmitted to the load device is cut off, by retroceding the knob 46, the locking protrusion 44 is separated from the locking groove 42, and accordingly the locking of the rotational unit 6 is released. In that state, by rotating the rotational unit 6 at a certain angle, when the protrusion 40 of the rotational unit 6 is inserted into the second groove 38 of the fixed unit 4, the connection terminal 14 is separated from the input terminal 10, and accordingly the power transmission to the load device is cut off. And, when the rotational unit 6 is locked by proceeding the knob 46, the power off state is maintained.

INDUSTRIAL APPLICABILITY

In a power plug in accordance with the present invention including a fixed unit inserted into a receptacle and a rotational unit connected to a power supply line, a connection position of the plug to the receptacle can be freely adjusted by rotating the rotational unit, and twists of the power supply line can be prevented by adjusting a position and a direction thereof by twisting the rotational unit according to positions of a load device and the receptacle.

In addition, by forming a power on/off means between the rotational unit and the fixed unit, power transmitted to the load device can be turned on/off according to the rotation of the rotational unit, and accordingly it is convenient to use.

In addition, by installing a locking means for locking the rotation of the rotational unit at the upper portion of the rotational unit, power on/off positions can be stably maintained.

What is claimed is:

1. A power plug, comprising:

a fixed unit at which prongs inserted into a receptacle are fixed and a connection terminal connected to the prongs is installed at the upper surface thereof;

a rotational unit rotationally arranged on the upper surface of the fixed unit and having an input terminal connected to a power supply line at the bottom surface;

a hinge shaft fixed to the fixed unit, penetrating the rotational unit and supporting the rotational unit rotationally;

an elastic member installed at the outer circumference of the hinge shaft to provide an elastic force for making the connection terminal and the input terminal maintain a contact state;

a power on/off means formed between the fixed unit and the rotational unit to transmit or cut off power supply to a load device according to rotation of the rotational unit; and a locking means installed at the upper portion of the rotational unit to lock the rotation of the rotational unit.

2. The power plug of claim 1, wherein the fixed unit is formed as a disc shape having a certain thickness and includes:

the hinge shaft fixed at the central portion;

the pair of prongs fixed at the bottom portion; and the pair of connection terminals having a semicircular band shape installed at the upper surface so as to be connected to the pair of prongs respectively.

3. The power plug of claim 1, wherein a ground plate is installed at the bottom surface of the fixed unit in the diameter direction, the both ends of the ground plate are curved and inserted into insertion grooves formed at the both sides of the fixed unit, the central portion of the ground plate is pierced, and the hinge shaft is contacted-inserted into the pierced central portion.

4. The power plug of claim 1, the rotational unit includes:
- the power supply line connecting to the load device and inserted into the side;
- the input terminal connected to the power supply line and installed at the bottom surface;
- a through hole vertically formed at the central portion to receive the hinge shaft rotationally; and
- a space portion formed at the upper portion of the rotational unit by being extended from the through hole.

5. The power plug of claim 1, wherein the hinge shaft is vertically inserted-fixed to the fixed unit, and a locking ring is inserted into the upper end of the hinge shaft so as to be caught on the rotational unit.

6. The power plug of claim 1, wherein the power on/off means includes:
- a first groove respectively formed at the upper surface of the fixed unit in the circumferential direction at regular intervals so as to have a certain depth;
- a second groove respectively formed between the first grooves and having a depth smaller than that of the first groove; and
- a protrusion respectively projected from the bottom surface of the rotational unit in the circumferential direction so as to have the same shape with the first and second grooves.

7. The power plug of claim 1, wherein the locking means includes:
- a locking ring inserted-combined with the upper end of the hinge shaft and having locking grooves formed at the outer circumferential direction at regular intervals;
- a knob installed at the space portion of the rotational unit so as to move linearly and having locking protrusions caught in the locking grooves; and
- a plate spring installed at the bottom surface of the knob to provide a certain elastic force to the knob.

8. The power plug of claim 7, wherein the end of the plate spring is contacted to the locking ring, and the other end is connected to a ground line, and accordingly the power plug is grounded.

* * * * *